United States Patent
Fan et al.

(10) Patent No.: US 9,723,556 B2
(45) Date of Patent: Aug. 1, 2017

(54) DRX METHOD WITH TDM LIMITATION AND USER EQUIPMENT USING THE SAME

(71) Applicant: Telefonaktiebolaget L M Ericsson (publ), Stockholm (SE)

(72) Inventors: Rui Fan, Beijing (CN); Shaohua Li, Beijing (CN); Qianxi Lu, Beijing (CN); Xinghua Song, Beijing (CN); Haochuan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 28 days.

(21) Appl. No.: 14/786,206

(22) PCT Filed: Apr. 24, 2013

(86) PCT No.: PCT/CN2013/074610
§ 371 (c)(1),
(2) Date: Oct. 22, 2015

(87) PCT Pub. No.: WO2014/172855
PCT Pub. Date: Oct. 30, 2014

(65) Prior Publication Data
US 2016/0073345 A1 Mar. 10, 2016

(51) Int. Cl.
*G08C 17/00* (2006.01)
*H04B 7/185* (2006.01)
(Continued)

(52) U.S. Cl.
CPC ..... *H04W 52/0216* (2013.01); *H04W 68/005* (2013.01); *H04W 72/0446* (2013.01);
(Continued)

(58) Field of Classification Search
CPC .................................................. H04W 52/0216
See application file for complete search history.

(56) References Cited

U.S. PATENT DOCUMENTS

2009/0262698 A1* 10/2009 Suga ..................... H04W 72/10
370/329
2012/0082077 A1 4/2012 Zhang et al.
(Continued)

FOREIGN PATENT DOCUMENTS

| CN | 101534544 A | 9/2009 |
| CN | 102036347 A | 4/2011 |

(Continued)

OTHER PUBLICATIONS

PCT Notification of Transmittal of the International Search Report and the Written Opinion of the International Searching Authority, or the Declaration for International application No. PCT/CN2013/074610, Jan. 30, 2014.
(Continued)

*Primary Examiner* — Gerald Smarth
(74) *Attorney, Agent, or Firm* — Baker Botts, LLP

(57) ABSTRACT

The disclosure relates to a DRX method with TRM limitation. In one embodiment, the DRX method comprises steps of detecting a DRX wake sub-frame to be set for a first BS at least partially overlaps with a sub-frame allocated to a second BS, and removing a collision of the DRX wake sub-frame to the sub-frame allocated to the second BS without change to the sub-frame allocated to the second BS. There is also provided a user equipment using the DRX method. By removing the collision without change to the sub-frames allocated in accordance with TDM, the user equipment may work in the DRX mode well.

27 Claims, 8 Drawing Sheets

(51) Int. Cl.
*H04W 52/02* (2009.01)
*H04W 76/04* (2009.01)
*H04W 68/00* (2009.01)
*H04W 72/04* (2009.01)
H04B 7/26 (2006.01)
H04W 88/10 (2009.01)

(52) U.S. Cl.
CPC ......... *H04W 76/048* (2013.01); *H04B 7/2656* (2013.01); *H04W 88/10* (2013.01); *Y02B 60/50* (2013.01)

(56) References Cited

U.S. PATENT DOCUMENTS

| | | | |
|---|---|---|---|
| 2012/0164948 A1 | 6/2012 | Narasimha et al. | |
| 2012/0275366 A1 | 11/2012 | Anderson et al. | |
| 2013/0201841 A1* | 8/2013 | Zhang ................... | H04L 1/1607 370/252 |
| 2014/0056278 A1* | 2/2014 | Marinier ............. | H04W 72/044 370/330 |

FOREIGN PATENT DOCUMENTS

| | | |
|---|---|---|
| EP | 2 315 486 | 4/2011 |
| EP | 2 362 697 | 8/2011 |
| JP | 4841630 | 12/2011 |
| WO | WO 2009119477 | 10/2009 |
| WO | WO 2010044721 | 4/2010 |

OTHER PUBLICATIONS

3GPP TS 36.321 V12.6.0; Technical Specification; 3rd Generation Partnership Project; Technical Specification Group Radio Access Network; Evolved Universal Terrestrial Radio (E-UTRA); Medium Access Control (MAC) protocol specification (Release 12), Jun. 2015.

3GPP TS 36.331 V12.5.0; Technical Specification; 3rd Generation Partnership Project; Technical Specification Group Radio Access Network; Evolved Universal Terrestrial Radio Access (E-UTRA); Radio Resource Control (RRC); Protocol specification (Release 12), Mar. 2015.

EPO issued European search report for Application No. / Patent No. 13883094.8-1855 / 2989727 PCT/CN2013074610—Nov. 17, 2016.

* cited by examiner

DRX METHOD WITH TDM LIMITATION AND USER EQUIPMENT USING THE SAME

PRIORITY

This nonprovisional application is a U.S. National Stage Filing under 35 U.S.C. §371 of International Patent Application Serial No. PCT/CN2013/074610, filed Apr. 24, 2013, and entitled "DRX Method With TDM Limitation and User Equipment Using the Same".

TECHNICAL FIELD

The disclosure relates to a Discontinuous Reception (DRX) method. In particular, the disclosure relates to a DRX method with Time Division Multiplexing (TDM) limitation and a User Equipment (UE) using the DRX method.

BACKGROUND

Unless otherwise indicated herein, the approaches described in this section are not prior art to the claims in this disclosure and are not admitted to be prior art by inclusion in this section.

The $3^{rd}$ Generation Partnership Project (3GPP) is a globally applicable third generation mobile phone system specification that is a result of collaboration between various groups of telecommunications associations, including the European Telecommunications Standards Institute, the Association of Radio Industries and Businesses/Telecommunication Technology Committee (ARIB/TTC), China Communications Standards Association, and the Alliance for Telecommunications Industry Solutions. 3GPP work is ongoing with Universal Terrestrial Radio Access Network (UTRAN) long term evolution (LTE). The 3GPP RAN2 working group has defined a Discontinuous Reception (DRX) mode to save battery life and resources of user equipment (UE). The main principle in DRX is that the UE behavior is defined relative to the successful decoding of the Physical Downlink Control Channel (PDCCH) by the UE. When the UE is in DRX, the UE is allowed to stop monitoring the PDCCH temporarily. DRX uses one or two pre-defined cycles (long and/or short cycles), at the beginning of which the UE monitors the PDCCH over a certain amount of transmission time intervals (TTIs), according to an "On Duration" Timer. The PDCCH carries downlink (DL) assignments as well as uplink (UL) grants.

Whether the UE is awake (e.g., is monitoring the PDCCH) or asleep after the On Duration period, depends on activity (i.e., possible reception of PDCCH control data during the period). To avoid unnecessary scheduling and to avoid wasting of radio resources, the base station (e.g., eNodeB) should know the state of the UE when transmitting downlink data from the base station to the UE. Thus, a set of clear rules for changing from the active state to DRX and back are defined in Reference [1] (3GPP Technical Specification (TS) 36.321, "Medium Access Control (MAC) Specification," V10.1.0, March, 2011).

FIG. 1 illustrates a traditional DRX mode which includes a long DRX cycle and a short DRX cycle. The UE turns on its receivers to monitor scheduling information on PDCCH. If no transmission on the PDCCH is detected, i.e., the UE wakes but no transmission on the PDCCH is detected, the UE may turn off its receivers, i.e., go to sleep, to reduce battery consumption. After a sleep period, the UE again turns on its receivers to monitor the PDCCH. The cycle is called a Long DRX cycle. If a transmission on the PDCCH is detected at a time, i.e., the UE wakes and a transmission on the PDCCH is detected, the UE shall continuously monitor the PDCCH, i.e., an Inactivity Timer is started to extend the active time for monitoring the PDCCH. When the Inactivity Timer expires, a short DRX cycle is started, during which the UE wakes with a shorter sleep period than that sleep period used in the long DRX cycle. After the short DRX cycle, the UE enters the long DRX cycle. The DRX mode is important to increase the standby times of mobile devices such as small handsets.

Reference [1] also provides some other parameters, such as drx-Retransmission Timer, mac-Contention Resolution Timer, HARQ RTT Timer and others that used in the DRX mode. FIG. 1 does not show these parameters for simplicity.

With the evolution of LTE system, LTE network switches from a homogeneous network into a heterogeneous network where there are provided a Macro eNB with higher transmission power for coverage purpose and a Pico eNB with lower transmission power for capacity purpose. As verified, the handover failure rate is increased in this heterogeneous network. It is therefore proposed that UE connect to both Macro eNB and Pico eNB concurrently, which is called dual connectivity.

Due to complicacy, some UEs support dual connectivity at L2 and/or L3. In other word, the UE's physical layer can only connect with either Macro eNB or Pico eNB at the same time slot. In order for this type of UE to work in "dual connectivity" scenario, sub-frames have to be partitioned into two sets, where sub-frames within one set are used for communication between the UE and Macro eNB, while sub-frames within the other set are used for communication between UE and Pico eNB. That is, the UE operates in a Time Division Multiplexing (TDM) pattern with Macro eNB and Pico eNB.

One issue as to how to coordinate between the TDM pattern and the DRX behavior for TDM type UE in this dual connectivity scenario occurs, since sub-frame partition is also adopted by the DRX mode as shown in FIG. 1 to save UE's power consumption.

SUMMARY

An object of the disclosure is to provide a DRX method with TDM limitation and a User Equipment using the DRX method, where the user equipment may work in a DRX mode well without confliction with the TDM pattern.

According to a first aspect, there is provided a Discontinuous Reception (DRX) method used in a User Equipment (UE), comprising steps of detecting a DRX wake sub-frame to be set for a first Base Station (BS) at least partially overlaps with a sub-frame allocated to a second BS; and removing a collision of the DRX wake sub-frame to the sub-frame allocated to the second BS without change to the sub-frame allocated to the second BS.

Preferably, the removing comprising delaying the DRX wake sub-frame so that it does not overlap with the sub-frame allocated to the second BS.

Preferably, the removing comprising dropping the DRX wake sub-frame.

Preferably, DRX threads for respective BSs are offset so that onDurationTimer of a DRX thread to be set for a BS falls in a sub-frame allocated to that BS.

Preferably, periodicity between two adjacent onDurationTimers in the DRX thread for the first BS is configured via Radio Resource Control (RRC) signalling so that onDurationTimer of the DRX thread falls in a sub-frame allocated to the first BS.

Preferably, the DRX method further comprises switching bearers between the first BS and the second BS so as to operate in an uplink and downlink decoupled mode when the UE handovers from the first BS to the second BS.

Preferably, the DRX method further comprises receiving a mode notification message indicating whether the first and second BSs are operating in an uplink and downlink decoupled mode.

Preferably, the DRX method further comprises switching bearers between the first BS and the second BS so as to operate in a dual connectivity mode if the mode notification message indicates that at least one of the first and second BSs is not operating in an uplink and downlink decoupled mode.

Preferably, the mode notification message is received in a form of Downlink Control Information (DCI) or Media Access Control (MAC) Control Element (CE).

Preferably, the first BS has a higher transmission power than the second BS. For example, the first BS is a macro eNB, while the second BS is a pico eNB.

According to a second aspect, there is provided a User Equipment (UE), comprising a detection unit configured to detect a DRX wake sub-frame to be set for a first Base Station (BS) at least partially overlaps with a sub-frame allocated to a second BS, and a collision removal unit configured to remove a collision of the DRX wake sub-frame to the sub-frame allocated to the second BS.

According to a third aspect, there is provided a User Equipment (UE), comprising a communication interface arranged for wireless communication, a processor, and a memory storing computer program code thereon which, when run in the processor, causes the UE to detect a DRX wake sub-frame to be set for a first Base Station (BS) at least partially overlaps with a sub-frame allocated to a second BS, and remove a collision of the DRX wake sub-frame to the sub-frame allocated to the second BS.

According to embodiments of the disclosure, the disclosure has the following advantages:

The TDM type UE can work in dual connectivity scenario well; and

The DRX mode can be used to achieve balance between Quality of Service (QoS) performance and power consumption reduction.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The techniques described herein may be used for various wireless communication networks such as CDMA, TDMA, FDMA, OFDMA, SC-FDMA and other networks. The terms "network" and "system" are often used interchangeably. The techniques described herein may be used for the wireless networks and radio technologies mentioned herein as well as other wireless networks and radio technologies proposed in the future. For clarity, certain aspects of the techniques are described below for LTE, and LTE terminology is used in much of the description below.

Exemplary Wireless Communication System

Figure 2:
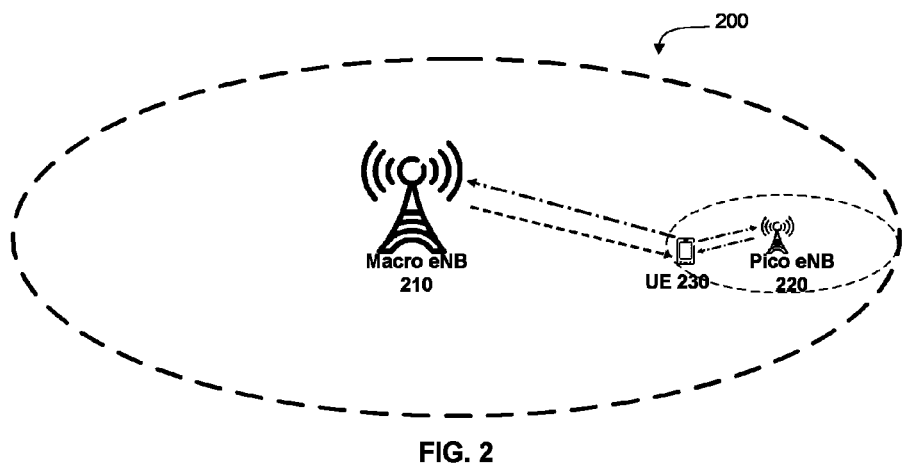
FIG. 2 illustrates a diagram of a wireless communication system where the disclosure may be implemented.

Referring now to FIG. 2, a diagram of a wireless communication system 200 where the disclosure may be implemented will be discussed. The wireless communication system 200 may include a number of evolved NodeBs (eNBs) and user equipments. An eNB may be a station that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) by providing a relative higher transmission power and may allow unrestricted access by UEs with service subscription. A pico cell may cover a relatively small geographic area by providing a smaller transmission power and may allow unrestricted access by UEs with service subscription. A femto cell may cover a relatively small geographic area (e.g., a home) by providing an even smaller transmission power and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB.

The wireless communication system 200 may also include relay stations (not shown). A relay station is a station that receives a transmission of data and/or other information from an upstream station (e.g., an eNB or a UE) and sends a transmission of the data and/or other information to a downstream station (e.g., a UE or an eNB).

The UEs may be dispersed throughout the wireless communication system 200, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc.

For simplicity, Macro eNB 210 and Pico eNB 220 are shown in FIG. 2 as examples of the eNBs. Furthermore, one UE, UE 230 is shown to be within the coverage of both Macro eNB 210 and Pico eNB 220.

As shown in FIG. 2, both Marco eNB 210 and Pico eNB 220 transmit scheduling information on a PDCCH (not shown) to UE 230 to schedule it. From the soft-cell perspective, Marco eNB 210 and Pico eNB 220 will be in the same cell in the UE point of view. According to the current 3GPP specification on DRX mode where no Cooperated Multiple Points (CoMP) scenario is considered, the inactivity timer and shortCycle timer are triggered by a transmission on the PDCCH for a specific UE. That is, when the UE detects Cell Radio Network Temporary Identity (C-RNTI) or Semi-Persistent Scheduling C-RNTI on the PDCCH, the inactivity timer and shortCycle timer are triggered to continuously monitor the PDCCH.

Figure 3:
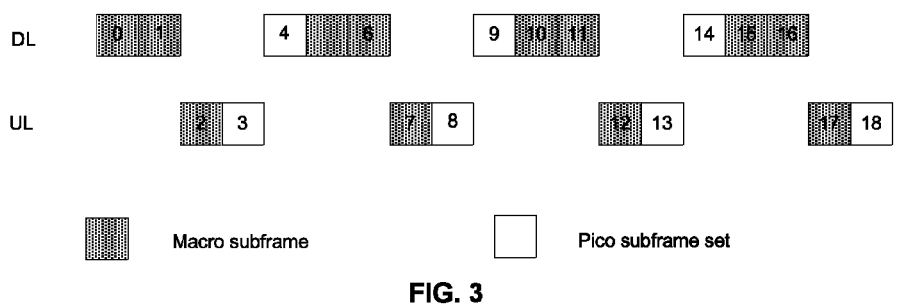
FIG. 3 shows an exemplary sub-frame partition of TDM pattern for a UE in the wireless communication system shown in FIG. 2.

FIG. 3 shows an exemplary sub-frame partition of TDM pattern for UE 230 in the wireless communication system 200. First of all, the sub-frames for the UE 230 are partitioned into two sets, one for uplink and the other for downlink. The sub-frame partition is made according to the scheduling of Marco eNB 210 and Pico eNB 220. For the sub-frames scheduled for uplink and those scheduled for downlink, they are further partioned into to two sets, one for Marco eNB 210 and the other for Pico eNB 220.

Figure 1:
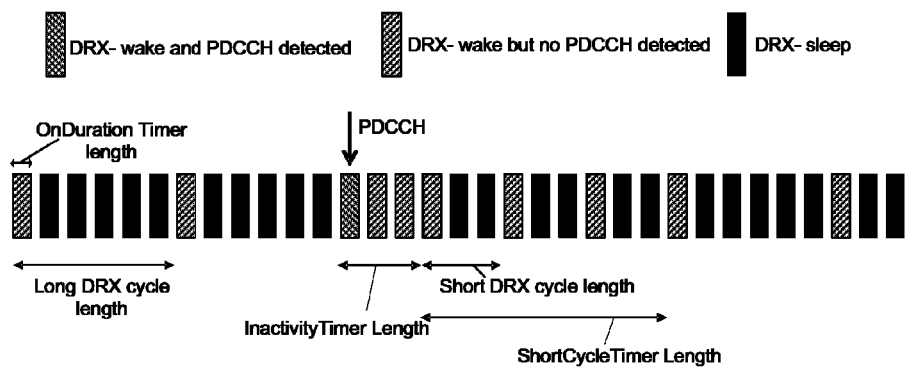
FIG. 1 illustrates a traditional DRX mode.

Recalling to FIG. 1, a UE supporting DRX mode awakes during inactivityTimer and onDurationTimer periods (according to the short/long cycle). Contrarily, as shown in FIG. 3, a UE operating in TDM pattern activates during a respetive sub-frame set. It is possible that the DRX mode and the TDM pattern do not match with each other, i.e., when the UE shall be active to receive from Macro eNB according to the DRX mode, the TDM pattern forbid it from receiving since the specific sub-frame belongs to the sub-frame set allocated to Pico eNB.

Exemplary DRX Operation

Figure 4:
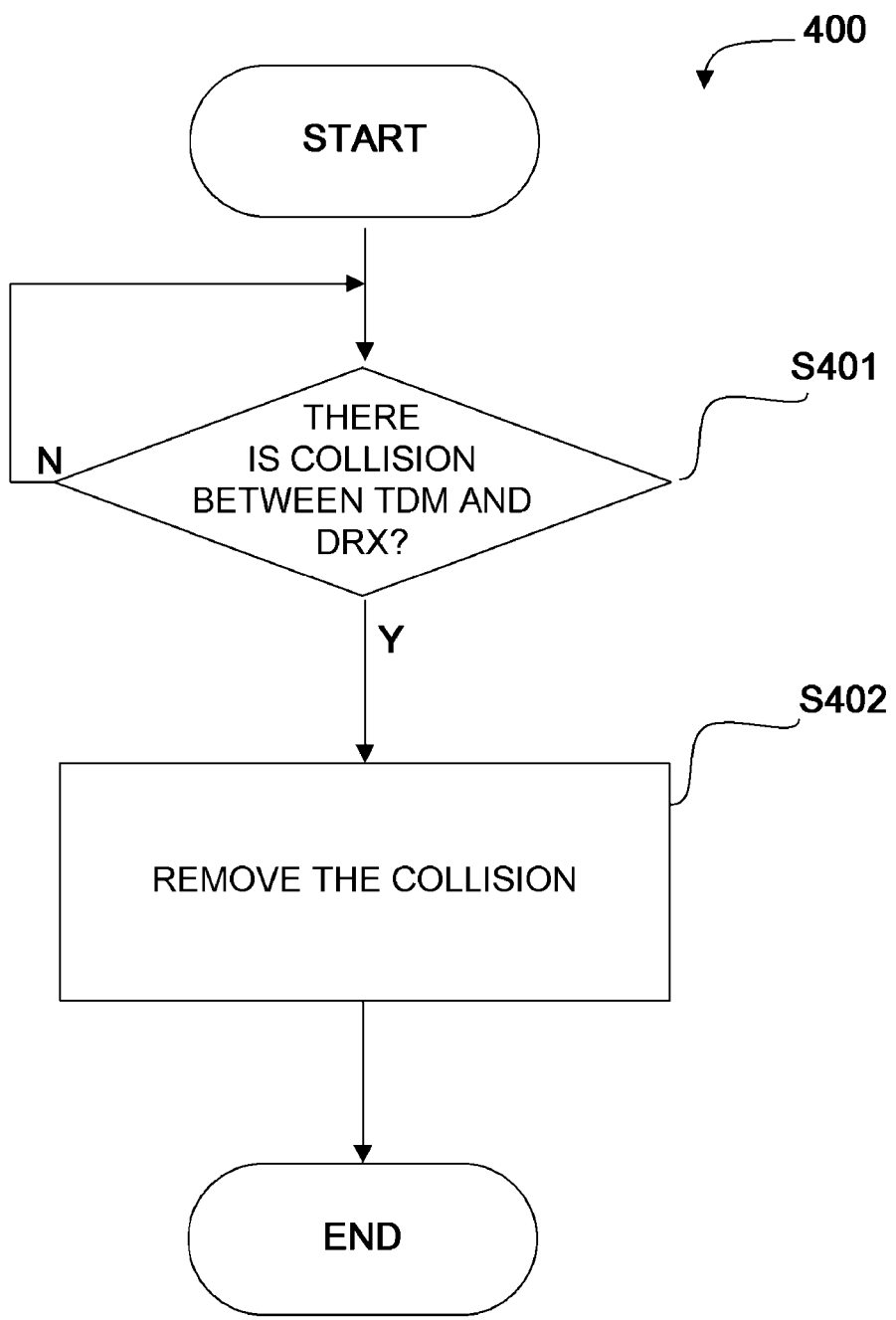
FIG. 4 illustrates a flowchart of a DRX method according to an embodiment of the disclosure.

FIG. 4 illustrates a flowchart of a DRX method 400 according to an embodiment of the disclosure. The method is applied to UE 230 in the wireless communication system 200 as shown in FIG. 2. As shown in FIG. 4, the method starts when UE 230 comes in the area covered by both Macro eNB and Pico eNB. UE 230 supports and enables a DRX mode. UE 230 detects whether there is a collision between the TDM pattern and the DRX mode at step S401.

If a collision is detected at step S401, UE 230 operates to remove the collision at step S402. The method then ends.

Herein the conflict is defined as when one sub-frame is a wake sub-frame with respect to an eNB according to the DRX mode, it actually not belongs to the sub-frame set allocated to that eNB according to the TDM pattern. In other words, the DRX wake sub-frame to be set for a first BS at least partially overlaps with a sub-frame allocated to a second BS. It is beneficial to avoid the collision as much as possible according to the RDM pattern, i.e., to remove the collision without change to the sub-frame allocated to the second BS. UE 230 re-configures the DRX sub-frames in such a way that the UE's active sub-frames are located at the available sub-frame set assigned by the TDM pattern.

Figure 5:
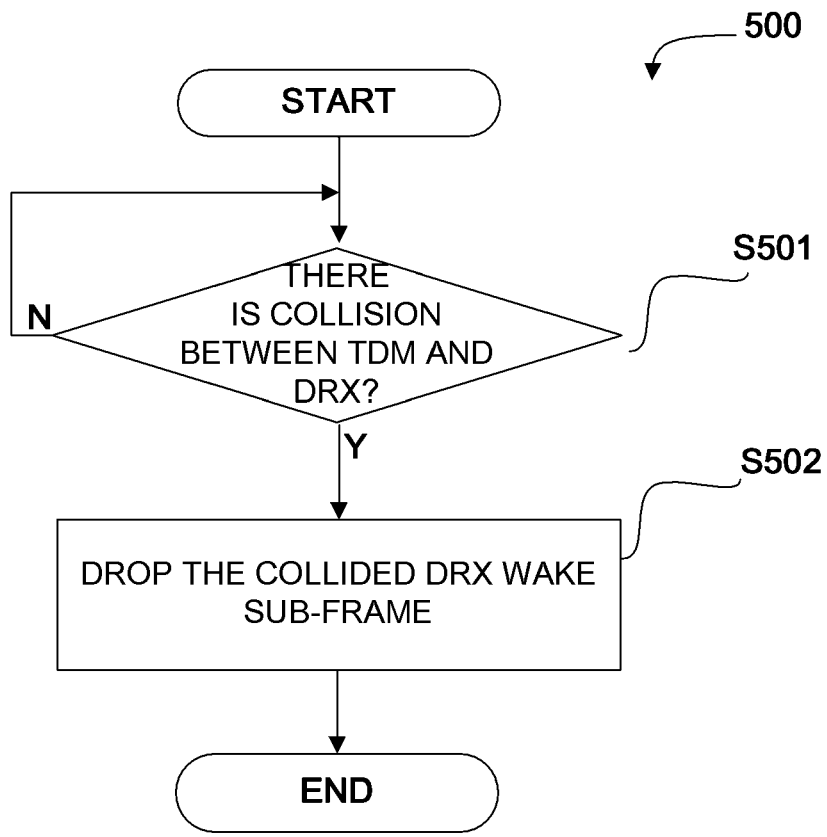
FIG. 5 shows a flowchart of an exemplary DRX method according to an embodiment of the disclosure.

FIG. 5 shows a flowchart of an exemplary DRX method 500 according to an embodiment of the disclosure. Similarly as method 400, the method 500 starts when UE 230 comes in the area covered by the two eNBs. At step S501, UE 230 detects a possible collision. If a collision is detected at step S501, the UE simply drops the collided DRX wake sub-frame at step S502 to remove the collision. The method then ends.

Figure 6:
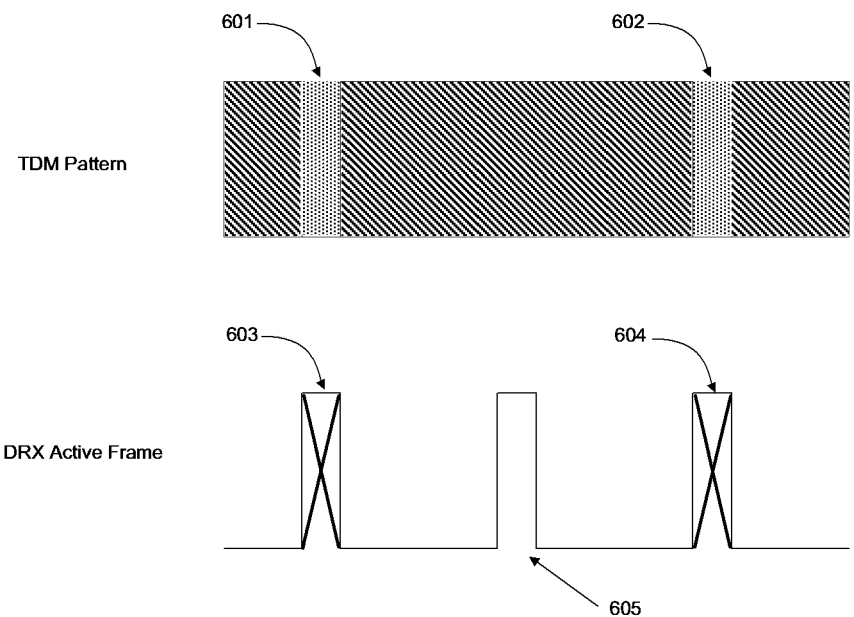
FIG. 6 illustrates a configuration of the TDM sub-frames and the DRX active sub-frames obtained by applying the method as shown in FIG. 5.

FIG. 6 illustrates a configuration of the TDM sub-frames and the DRX active sub-frames obtained by applying the method as shown in FIG. 5. As shown in FIG. 6, sub-frames 603, 605 and 604 are active to receive or transmit data from/to a first eNB according to the DRX mode. At the same time, sub-frames 601 and 602 are assigned to a different eNB according to the TDM pattern. Sub-frame 601 overlaps with sub-frame 603, and sub-frame 602 overlaps with sub-frame 604. Accordingly, there is a collision between the TDM pattern and the DRX mode. The UE operates to remove the collision by dropping sub-frames 603 and 604. That is, the UE will not awake to communicate with the first eNB during the sub-frames 603 and 604.

Figure 7:
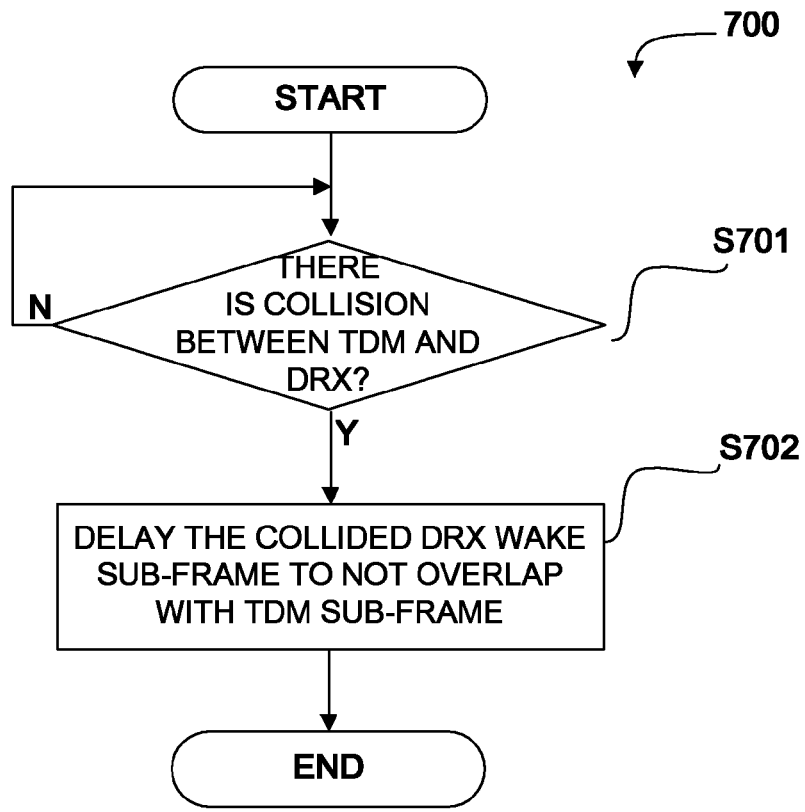
FIG. 7 shows a flowchart of another exemplary DRX method according to an embodiment of the disclosure.

FIG. 7 shows a flowchart of another exemplary DRX method 700 according to an embodiment of the disclosure. Similarly as method 500, the method 700 starts when a UE comes in the area covered by two eNBs.

At step S701, the UE detects a possible collision. If a collision is detected at step S701, the UE delays the collided DRX wake sub-frame at step S702 to remove the collision. The method then ends.

Figure 8:
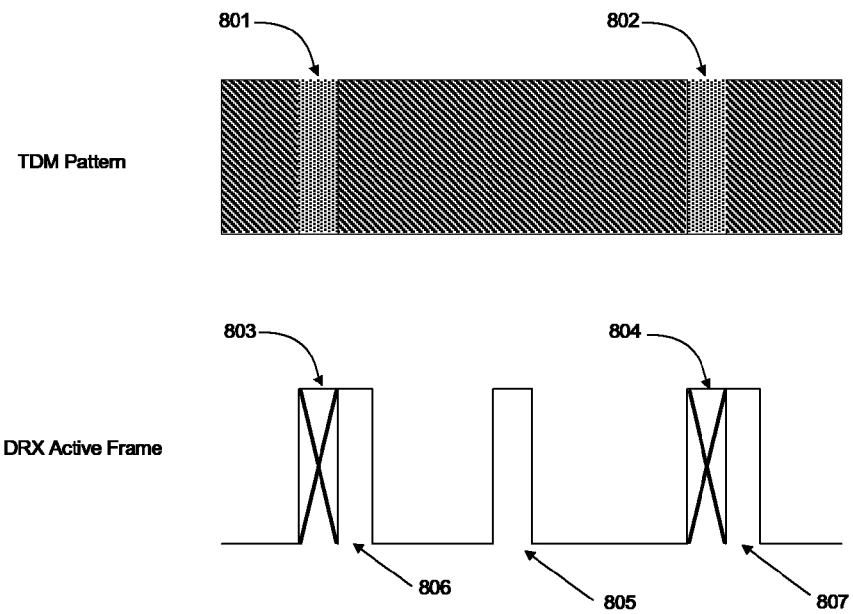
FIG. 8 illustrates the TDM sub-frames and the DRX active sub-frames obtained by applying the method as shown in FIG. 7.

FIG. 8 illustrates the TDM sub-frames and the DRX active sub-frames obtained by applying the method as shown in FIG. 7. As shown in FIG. 8, sub-frames 803, 805 and 804 are active to receive or transmit data from/to a first eNB according to the DRX mode. At the same time, sub-frames 801 and 802 are assigned to a different eNB according to the TDM pattern. Sub-frame 801 overlap with sub-frame 803, and sub-frame 802 overlap with sub-frame 804. Accordingly, there is a collision between the TDM pattern and the DRX mode. The UE operates to remove the collision by delaying sub-frames 803 and 804 so as not to overlap with the collided TDM sub-frames 801 and 802, i.e. to sub-frames 806 and 807. That is, the UE will awake to communicate with the current BS during the delayed sub-frames 806 and 807. As for the sub-frame 805, it is allocated to the current first eNB according to the TDM pattern, and thus the UE will awake to communicate with the current eNB during sub-frame 805 as usual.

Figure 9:
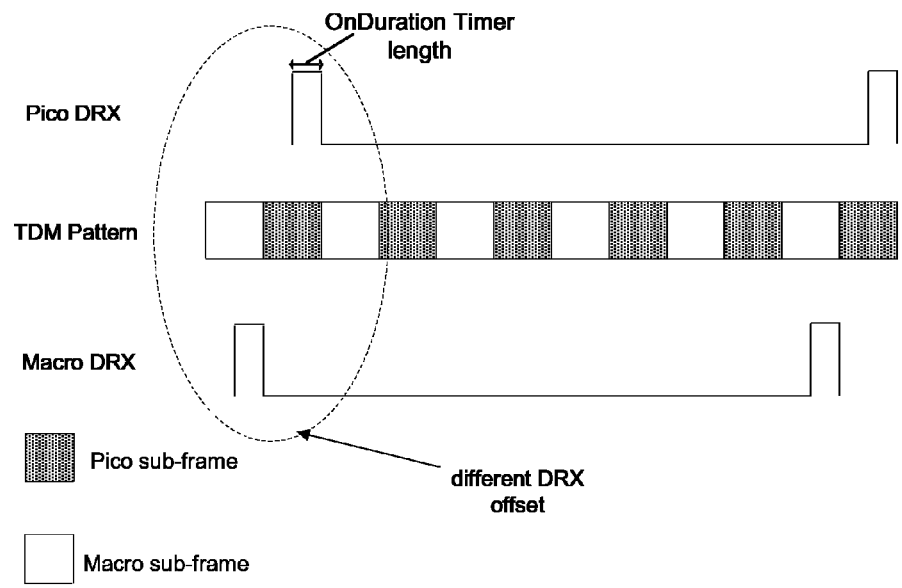
FIG. 9 shows an example of offsetting the DRX threads for at least two eNBs to prevent the collision.

It is recognized that a special configuration on the DRX threads may prevent the possible collision. FIG. 9 shows an example of offsetting the DRX threads for at least two eNBs to prevent the collision. Consider the case where the TDM pattern repeat in a length of 8 ms, the ratio between the carriers for the first eNB and the second eNB is 1:1, and the DRX cycle is set as 40 ms. The DRX start offset of the DRX threads of the two eNBs can be set in such a way that each onDurationTimer (2 ms) will cause no collision with the TDM pattern.

Recalling to FIG. 1, UE's active sub-frames are not only trigged by onDuration Timer in a pre-defined way, but depend on the traffic variation. The length of Onduration-Timer, shortCycle Timer and Inactivity Timer are fixed by the Radio Resource Control (RRC) configuration of the UE. In an alternative embodiment, it may try to avoid the possible collision by configuring appropriately the periodicity or interval between the OnDurationTimers, i.e., the interval between the shortCycle and longCycle via RRC signalling. However, a collision may occur even if the DRX thresholds for respective eNBs are specially offset or appropriately configured. The UE may use the methods according to the disclosure to remove the possible collision.

Exemplary Decoupled Scenario

Figure 10:
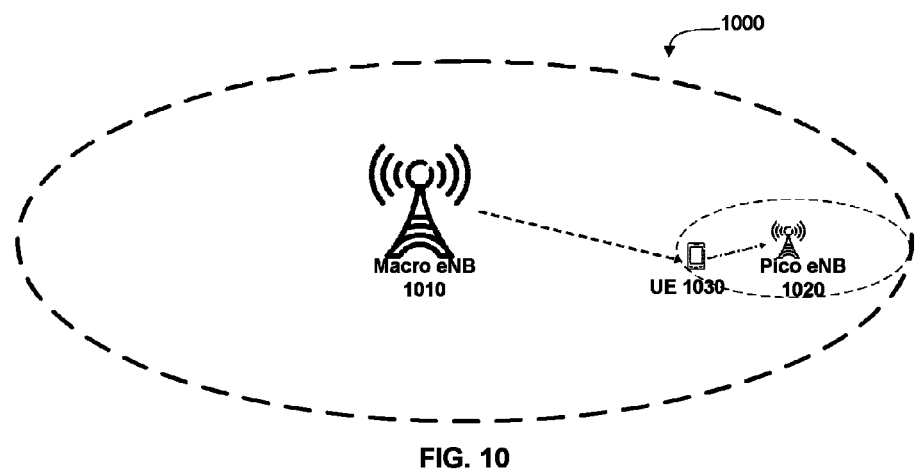
FIG. 10 illustrates a system in which a UE is in a typical uplink and downlink decoupled mode.

FIG. 10 illustrates a system 1000 where a UE is in a typical uplink and downlink decoupled mode. As shown in FIG. 10, UE 1030 is located in an area served by Macro eNB 1010 and Pico eNB 1020. As Macro eNB 1010 has a much higher transmission power than Pico eNB 1020, the coverage is different for the Macro cell and the Pico cell. For UE 1030 located in the macro cell coverage but at the boundary of the Pico cell, the received downlink signal from Macro eNB 1010 is stronger than that from Pico eNB 1020. Hence UE 1030 is associated with the macro cell and receives downlink signals from the macro cell. For the uplink, since UE 1030 is closer to Pico eNB 1020 than to Macro eNB 1010, it is better to select Pico eNB 1020 as the reception point of the uplink, in order to reduce the transmission power of UE and the interference to other UEs in the Pico cell. Therefore, for UE 1030, Macro eNB 1010 is the downlink serving node while Pico eNB 1020 is the uplink serving node. This is the so-called decoupled uplink and downlink mode. Herein the mode where both the Macro eNB and the Pico eNB are serving nodes of UE, i.e., Macro and Pico eNBs have both downlink and uplink data flows for the UE, is called a dual connectivity mode, as shown in FIG. 2.

Switching Between Dual Connectivity Mode and Uplink and Downlink Decoupled Mode

Figure 11:
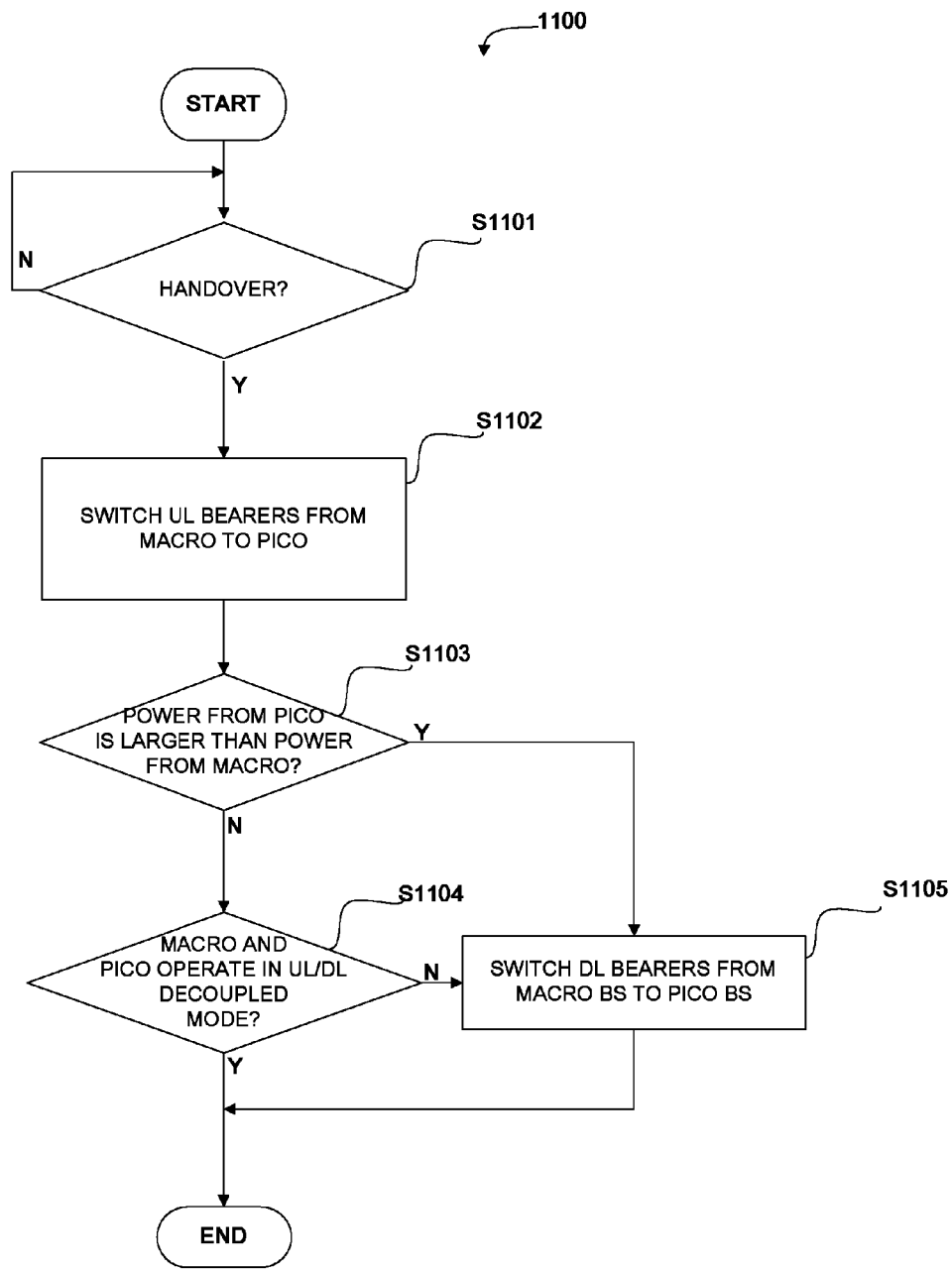
FIG. 11 illustrates a flowchart of a method for switching between the dual connectivity mode and decoupled uplink and downlink mode according to an embodiment of the disclosure.

FIG. 11 illustrates a flowchart of a method 1100 for switching between the dual connectivity mode and decoupled uplink and downlink mode according to an embodiment of the disclosure. Take the scenario as shown in FIG. 10 as an example of the scenario where method 1100 operates. UE 1030 moves around in the system. The method starts when UE 1030 enters the boundary between the areas served by Macro eNB 1010 and Pico eNB 1020. At step S1101, it is detected whether the UE shall be handover. If yes, for example, UE 1030 moves from an area served by Macro eNB 1010 to an area covered by Pico eNB 1020 and is closer to Pico eNB 1020 than to Macro eNB 101, UE 1030 switches its uplink bearers from Macro eNB 1010 to Pico eNB 1020 at step S1102. At step S1103, it is determined whether the signal power from Pico eNB 1020 is lower than that from Macro eNB 1010. If the signal power from Pico eNB 1020 is lower than that from Macro eNB 1010, UE 1030 switches the downlink bearers from Macro eNB 101 to Pico eNB 1020 at step S1105. If it is determined that the signal power from Pico eNB 1020 is not larger than that from Macro eNB 1010, it is determined whether Macro 1010 and Pico eNB 1020 support and operate in decoupled uplink and downlink mode at step S1104. If at least one of Macro eNB 1010 and Pico eNB 1020 does not support the decoupled uplink and downlink mode, the method proceeds to step S1105, where UE 1030 switches the downlink bearers from Macro eNB 1010 to Pico eNB 1020. The switching process ends then. If it is determined that both Macro eNB 1010 and Pico eNB 1020 support and enable the decoupled uplink and downlink mode at step S1104, UE 1030 may maintain the downlink carriers to Macro eNB.

Figure 12:
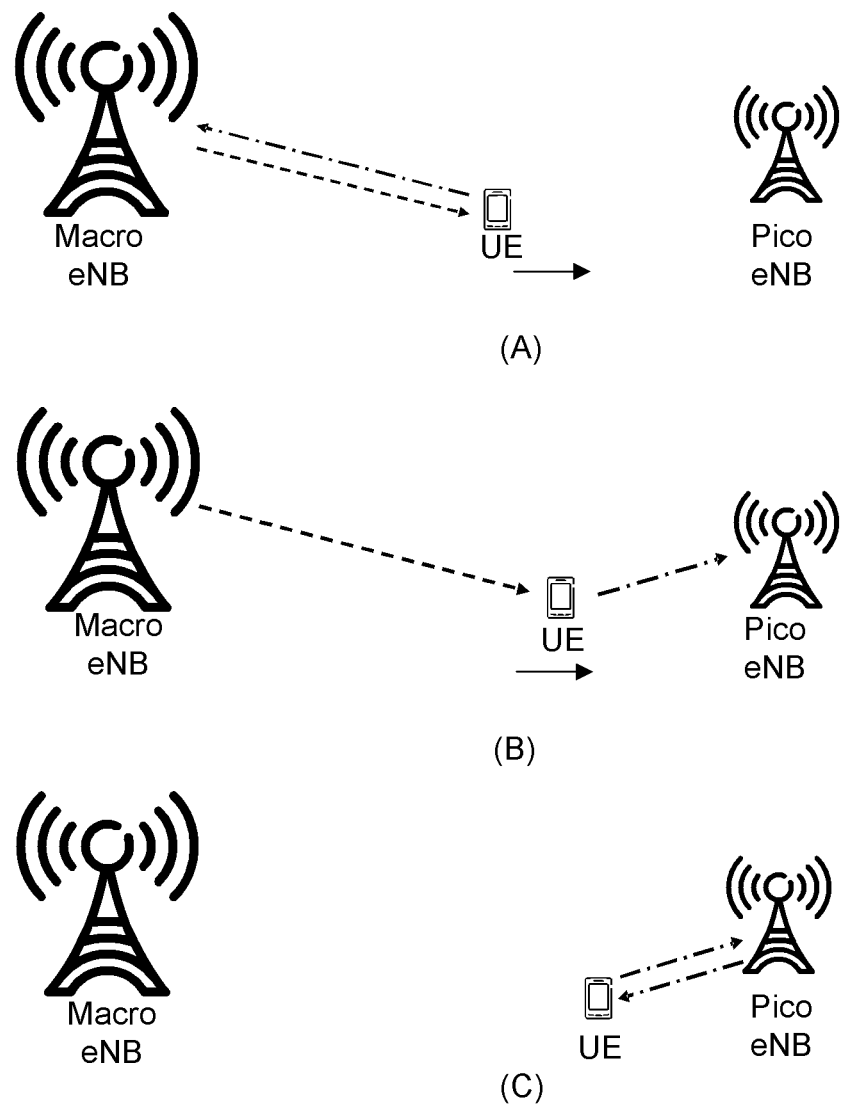
FIG. 12 shows a scenario of switching between the dual connectivity mode and decoupled uplink and downlink mode according to an embodiment of the disclosure.

FIG. 12 shows a scenario of switching between the two modes. As shown in (A) of FIG. 12, Macro eNB serves UE at both the uplink and downlink. When the UE moves to be closer to Pico eNB than to Macro eNB, it switches uplink bearers from Macro eNB to Pico eNB first, as shown in (B) of FIG. 12. If a signalling is received at the UE, notifying that Pico eNB does not operate in a decoupled uplink and downlink mode, the UE switches its downlink bearers from Macro eNB to Pico eNB, as shown in (C) of FIG. 12. The signalling may be in form of Downlink Control Information (DCI) or Media Access Control (MAC) Control Element (CE). This is also useful when a new bearer (including downlink data flow) is added to the Pico or Macro carriers, even though there is only uplink data flow at the Pico BS currently. This signalling can be sent from either Macro BS or Pico BS to the UE, considering when there is only uplink carrier at Pico Cell, the UE will not monitor Pico PDCCH when uplink buffer is empty.

The same criterion is applicable to the cell change from Pico to Macro. The downlink carriers are switched from Macro eNB to Pico eNB first when the signal power from the Macro eNB is larger than that from Pico eNB. After that, the uplink carriers are then switched from Macro eNB to eNB if needed. That is, when a handover occurs to the UE, it switches from the dual connectivity mode associated with the source eNB to an uplink and downlink decoupled mode by switching carriers of uplink or downlink from the source eNB to the target eNB (depending on switching from Macro to Pico or switching from Pico to Macro). It is then determined whether the source and target eNBs support the uplink and downlink decoupled mode or not. If either eNB does not support the uplink and downlink decoupled mode, the UE switch carriers of the other one of uplink or downlink to operate in a dual connectivity mode associated with the target eNB. Otherwise, if both eNBs support and enable the uplink and downlink decoupled mode, the UE may retain in the decoupled mode.

The methods according to the disclosure described above may be performed by any suitable components or other means capable of performing the corresponding functions of the methods. For example, the methods may be performed by components of a communication point, such as a UE, illustrated below in FIG. 13.

Figure 13:
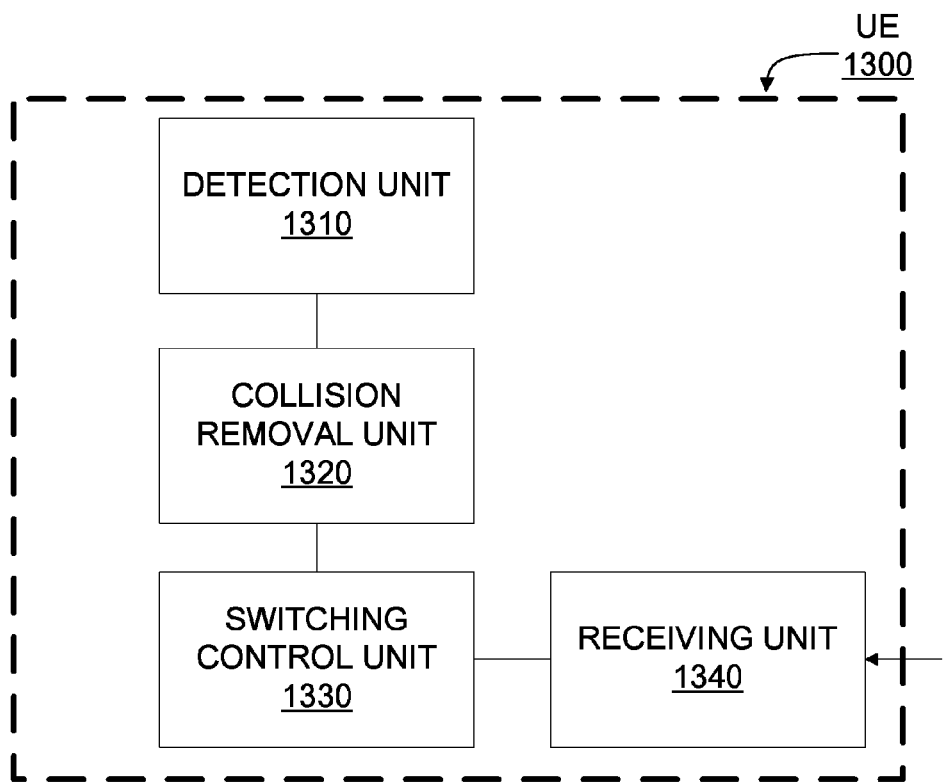
FIG. 13 illustrates a block diagram of a UE according to an embodiment of the disclosure.

FIG. 13 illustrates a block diagram of UE 1300 according to an embodiment of the disclosure. As shown in FIG. 13, UE 1300 comprises a detection unit 1310 and a collision removal unit 1320. For a UE enabling a DRX mode, the detection unit 1310 is configured to detect whether there is a collision between the DRX mode and the TDM mode. That is, it is detected whether a DRX wake sub-frame to be set for a first eNB at least partially overlaps with a sub-frame allocated to another eNB. If there is a DRX wake sub-frame to be set for the first eNB overlaps with a sub-frame allocated to another eNB, the collision removal unit 1120 is configured to work to remove the collision. In an example, the collision removal unit 1320 is configured to delay the DRX wake sub-frame so that it does not overlap with the sub-frame allocated to another eNB. As another example, the collision removal unit 1320 is configured to drop the collided DRX wake sub-frame simply. Any other alternative configuration for removing the collision is applicable.

UE 1300 may further comprise a switching control unit 1330 configured to switch bearers between the first and the other eNBs and a receiving unit 1340 configured to receive signalling from the eNBs. When UE 1300 moves in the system (e.g., as shown in FIG. 12), the switching control unit 1330 is configured to switch from a dual connectivity mode to an uplink and downlink decoupled mode when a handover occurs. For example, uplink bearers are switched from Macro eNB to Pico eNB, as shown in (B) of FIG. 12. If the receiving unit 1340 receives a mode notification message from either Macro eNB or Pico eNB indicating that both Macro eNB and Pico eNB are operating in an uplink and downlink decoupled mode, the switching control unit 1330 is configured to retain in the uplink and downlink decoupled mode. For example, the switching control unit 1330 is configured to maintain the downlink bearers to Macro eNB if the signal power from Macro eNB is larger than that from Pico eNB. In an embodiment, the mode notification message received by the receiving unit 1340 indicates that at least one of Macro eNB and Pico eNB does not support the uplink and downlink decoupled mode, the switching control unit 1330 is configured to switch from the uplink and downlink decoupled mode to a dual connectivity mode. For example, the switching control unit 1330 is configured to switch downlink bearers to Pico eNB as shown in (C) of FIG. 12 irrespective as to whether the signal power from Macro eNB is lower than that from Pico eNB. The mode notification message may be in form of Downlink Control Information (DCI) or Media Access Control (MAC) Control Element (IE).

FIG. 13 does not show the configuration in a unit of hardware but shows the block in a functional unit. It should be noted that the user equipment 1300 of FIG. 13 may include more or fewer elements than shown, in various arrangements, and each component may be implemented in hardware, software or combination thereof.

Figure 14:
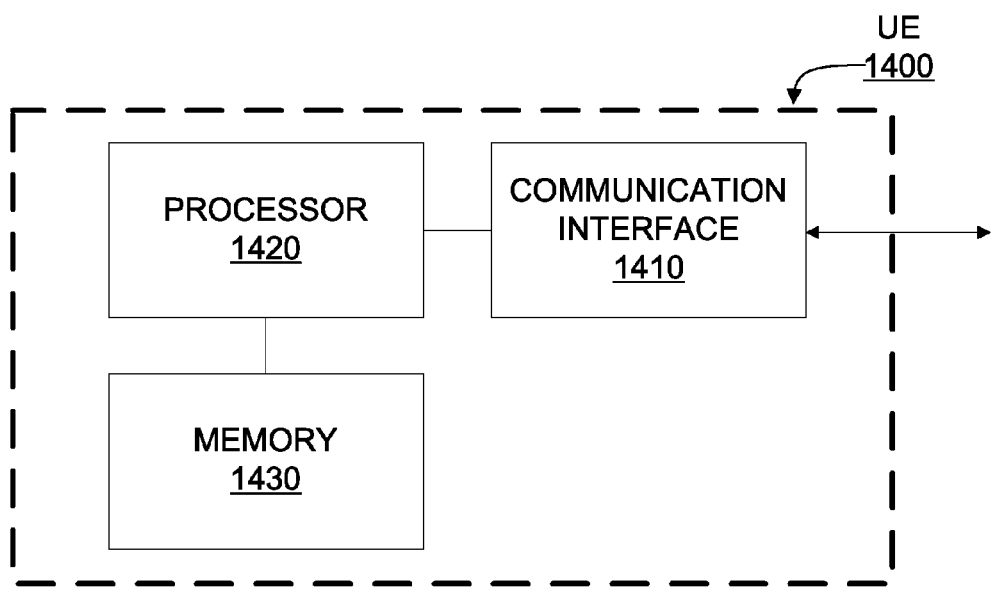
FIG. 14 is a schematic view of an exemplary is a schematic view of a UE according to an embodiment of the disclosure.

FIG. 14 is a schematic view of UE 1400 according to an embodiment of the disclosure. UE 1400 comprises a controller or a processor 1420 comprising e.g., any suitable Central Processing Unit, CPU, microcontroller, Digital Signal Processor, DSP, etc., capable of executing computer program code. The computer program code may be stored in a memory 1430. The memory 1430 may be any combination a Read And write Memory, RAM, and a Read Only Memory, ROM. The memory may also comprise persistent storage, which, for example, can be any single one or combination of magnetic memory, optical memory, or solid state memory or even remotely mounted memory. The exemplary UE 1400 further comprises a communication interface 1410 arranged for wireless communication with other devices or nodes, such as a eNB that serves the UE.

The computer program code, when loaded from the memory 1430 and run in the processor 1420, causes UE 1400 to perform the methods according to the disclosure, such as methods 400, 500 and 700. In an embodiment, the computer program code, when executed, cause UE 1400 to detect whether a DRX sub-frame to be set for a first eNB at least partially overlaps with a sub-frame allocated to a second eNB, and remove a collision of the DRX wake sub-frame to the sub-frame allocated to the second eNB without change to the sub-frame allocated to the second eNB. In another embodiment, the computer program code causes UE 1400 to delay the DRX wake sub-frame so that it does not overlap with the sub-frame allocated to the second eNB, or drop the DRX wake sub-frame, so as to remove the collision.

According to foregoing embodiments of the disclosure, the disclosure has the following advantages:

The TDM type UE can work in dual connectivity scenario well; and

The DRX mode can be used to achieve balance between Quality of Service (QoS) performance and power consumption reduction.

The foregoing description of implementations provides illustration and description, but is not intended to be exhaustive or to limit the disclosure to the precise form disclosed. Modifications and variations are possible in light of the above teachings, or may be acquired from practice of the disclosure. For example, while blocks have been described with regard to FIGS. 4, 5 and 7 in a specific order, the order of the blocks may be modified in other implementations consistent with the principles of the disclosure. Further, non-dependent blocks may be performed in parallel.

Aspects of the disclosure may also be implemented in methods and/or computer program products. Accordingly, the disclosure may be embodied in hardware and/or in hardware/software (including firmware, resident software, microcode, etc.). Furthermore, the disclosure may take the form of a computer program product on a computer-usable or computer-readable storage medium having computer-usable or computer-readable program code embodied in the medium for use by or in connection with an instruction execution system. The actual software code or specialized control hardware used to implement embodiments described herein is not limiting of the disclosure. Thus, the operation and behaviour of the aspects were described without reference to the specific software code—it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A Discontinuous Reception (DRX) method used in a User Equipment (UE), comprising:

detecting a DRX wake sub-frame to be set for a first Base Station (BS) at least partially overlaps with a sub-frame allocated to a second BS; and removing a collision of the DRX wake sub-frame to the sub-frame allocated to the second BS without change to the sub-frame allocated to the second BS.

2. The DRX method of claim 1, wherein removing comprising:

delaying the DRX wake sub-frame so that it does not overlap with the sub-frame allocated to the second BS.

3. The DRX method of claim 1, wherein removing comprising:

dropping the DRX wake sub-frame.

4. The DRX method of claim 1, wherein DRX threads for respective BSs are offset so that onDurationTimer of a DRX thread to be set for a BS falls in a sub-frame allocated to that BS.

5. The DRX method of claim 1, wherein periodicity between two adjacent onDurationTimers in the DRX thread for the first BS is configured via Radio Resource Control (RRC) signalling so that onDurationTimer of the DRX thread falls in a sub-frame allocated to the first BS.

6. The DRX method of claim 1, further comprising:

switching bearers between the first BS and the second BS to operate in an uplink and downlink decoupled mode when the UE handovers from the first BS to the second BS.

7. The DRX method of claim 6, further comprising:

receiving a mode notification message indicating whether the first and second BSs are operating in an uplink and downlink decoupled mode.

8. The DRX method of claim 7, further comprising:

switching bearers between the first BS and the second BS to operate in a dual connectivity mode if the mode notification message indicates that at least one of the first and second BSs is not operating in an uplink and downlink decoupled mode.

9. The DRX method of claim 7, wherein the mode notification message is received in a form of Downlink Control Information (DCI) or Media Access Control (MAC) Control Element (CE).

10. The DRX method of claim 1, wherein the first BS has a higher transmission power than the second BS.

11. A User Equipment (UE), comprising:

a detection unit configured to detect a Discontinuous Reception (DRX) wake sub-frame to be set for a first Base Station (BS) at least partially overlaps with a sub-frame allocated to a second BS; and a collision removal unit configured to remove a collision of the DRX wake sub-frame to the sub-frame allocated to the second BS without change to the sub-frame allocated to the second BS.

12. The UE of claim 11, wherein the collision removal unit is configured to delay the DRX wake sub-frame so that it does not overlap with the sub-frame allocated to the second BS.

13. The UE of claim 11, wherein the collision removal unit is configured to drop the DRX wake sub-frame.

14. The UE of claim 11, wherein DRX threads for respective BSs are offset so that onDurationTimer of a DRX thread to be set for a BS falls in a sub-frame allocated to that BS.

15. The UE of claim 11, wherein periodicity between two adjacent onDurationTimers in the DRX thread for the first BS is configured so that onDurationTimer of the DRX thread falls in a sub-frame allocated to the first BS.

16. The UE of claim 15, further comprising:

a receiving unit configured to receive a mode notification message indicating whether the first and second BSs is operating in an uplink and downlink decoupled mode.

17. The UE of claim 16, wherein the switching control unit is configured to switch bearers between the first BS and the second BS to operate in a dual connectivity mode if the mode notification message indicates that at least one of the first and second BSs is not operating in a uplink and downlink decoupled mode.

18. The UE of claim 16, wherein the mode notification message is received in a form of Downlink Control Information (DCI) or Media Access Control (MAC) Control Element (CE).

19. The UE of claim 11, further comprising:

a switching control unit configured to switch bearers between the first BS and the second BS to operate in an uplink and downlink decoupled mode when the UE handovers from the first BS to the second BS.

20. A User Equipment (UE), comprising:

a communication interface arranged for wireless communication;

a processor; and a memory storing computer program code thereon which, when run in the processor, causes the UE to:

detect a Discontinuous Reception (DRX) wake sub-frame to be set for a first Base Station (BS) at least partially overlaps with a sub-frame allocated to a second BS; and remove a collision of the DRX wake sub-frame to the sub-frame allocated to the second BS without change to the sub-frame allocated to the second BS.

21. The UE of claim 20, which is further caused to delay the DRX wake sub-frame so that it does not overlap with the sub-frame allocated to the second BS.

22. The UE of claim 20, which is further caused to drop the DRX wake sub-frame.

23. The UE of claim 20, which is further caused to offset DRX threads for respective BSs so that onDurationTimer of a DRX thread to be set for a BS falls in a sub-frame allocated to that BS.

24. The UE of claim 20, which is further caused to configure periodicity between two adjacent onDurationTimers in the DRX thread for the first BS so that onDurationTimer of the DRX thread falls in a sub-frame allocated to the first BS.

25. The UE of claim 20, which is further caused to switch bearers between the first BS and the second BS so as to operate in an uplink and downlink decoupled mode when the UE handovers from the first BS to the second BS.

26. The UE of claim 25, which is further caused to receive a mode notification message indicating whether the first and second BSs are operating in an uplink and downlink decoupled mode.

27. The UE of claim 26, which is further caused to switch bearers between the first BS and the second BS so as to operate in a dual connectivity mode if the mode notification message indicates that at least one of the first and second BSs is not operating in an uplink and downlink decoupled mode.

* * * * *